(12) United States Patent
Angele

(10) Patent No.: US 6,872,891 B2
(45) Date of Patent: Mar. 29, 2005

(54) CABLE SPLICE CASE EXPANSION RING AND SYSTEM FOR SPLICING CABLE

(76) Inventor: Dallas Angele, P.O. Box 60255, Santa Barbara, CA (US) 93160

( * ) Notice: Subject to any disclaimer, the term of this patent is extended or adjusted under 35 U.S.C. 154(b) by 0 days.

(21) Appl. No.: 10/283,937

(22) Filed: Oct. 30, 2002

(65) Prior Publication Data
US 2004/0084202 A1 May 6, 2004

(51) Int. Cl.[7] .................................................. H02G 3/06
(52) U.S. Cl. ........................................................ 174/93
(58) Field of Search ................................. 174/93, 77 R, 174/92, 138 F

(56) References Cited

U.S. PATENT DOCUMENTS

| 3,935,373 | A | * | 1/1976 | Smith et al. ............... 174/77 R |
| 4,181,814 | A | | 1/1980 | Smith |
| 4,424,412 | A | | 1/1984 | Goetter et al. |
| 4,558,174 | A | * | 12/1985 | Massey ........................ 174/92 |
| 4,933,512 | A | * | 6/1990 | Nimiya et al. ................ 174/92 |
| 5,792,991 | A | * | 8/1998 | Nolf ............................. 174/92 |
| 5,793,921 | A | * | 8/1998 | Wilkins et al. ............. 385/135 |
| 6,037,544 | A | * | 3/2000 | Lee et al. ...................... 174/92 |
| 6,242,700 | B1 | * | 6/2001 | Smith ....................... 174/77 R |

* cited by examiner

Primary Examiner—Chau N. Nguyen
(74) Attorney, Agent, or Firm—Fulbright & Jaworski

(57) ABSTRACT

An expansion ring for expanding the perimeter of a splice case end plate. The ring comprises two face plates and a rim connected to and separating the face plates, with an aperture through the face plates. The ring fits around the perimeter of the end plate, forming an air tight, environmental seal. Once in place, a splice case housing can be installed over the expanded end plate. The present invention also provides a method of expanding the perimeter of an end plate, a method of installing a larger splice case housing over a smaller end plate, and a splice case, each based on the end plate expansion ring, and a method for repairing a damaged cable line where the repair is interrupted in time.

23 Claims, 8 Drawing Sheets

CABLE SPLICE CASE EXPANSION RING AND SYSTEM FOR SPLICING CABLE

FIELD OF THE INVENTION

This invention relates generally to cable splice cases and, more particularly, to expansion rings for splice case end plates.

BACKGROUND OF THE INVENTION

Communication and electrical cable splices are protected from environmental damage by housing in cable splice cases, which protect from moisture, humidity, corrosive environments and the like. Some cable systems employ compressed air in the cables and splice cases to prevent moisture intrusion against the air flow. In these systems, for efficiency and economy, minimizing air loss is advantageous. Thus, cable splice cases can be airtight as well as environmentally sealed.

A variety of cable splice cases are known. Typically, the cases include a cylindrical housing for containing the cable splice, and a pair of circular end plates that fit tightly into the ends of the housing, providing airtight, environmental seals. In one design, the splice case is formed from two half-housings that are installed over suitably prepared end plates.

Communication and electrical cables that extend through openings in the end plates must also be airtight and environmentally sealed against the openings. Various means of sealing are known including compressible collars, O-rings and sealing tape.

A damaged cable line is usually repaired by replacing the entire damaged section of cable lying between two contiguous splice cases. The splice cases are placed in separate manholes. Usually, emergency work restores service to customers before the damaged cable line has been replaced. To replace the cable, both splice cases must be opened and a new section of cable installed. When replacement takes several days, the splice cases must be closed and sealed at the end of each working day. During repair, both damaged and new sections of cable are present and both must be protected by the contiguous splice cases. If the original splice cases are too small to accommodate both sections, larger splice cases must be employed.

Currently, switching to a larger splice case involves replacing both end plates with new, larger end plates. Preparing a new end plate to receive cables in an airtight and environmentally sealed manner is a time consuming task. Further, after repair and removal of the damaged section, the original, splice case (or one of similar dimensions) must be reinstalled due to space limitations in the manhole. Thus, both larger end plates must be changed back to smaller end plates, consuming additional preparation time. Because two contiguous splice cases are involved, and four new end plates are prepared per splice case, in all, eight new end plates must be prepared during cable replacement.

Another problem caused by switching end plates back and forth is further damage to the cables. The process of preparing cables to form air tight, environmental seals can introduce cable deformities, as can the process of installing and removing end plates from around cables. Cable deformities increase the chance of air leaks.

SUMMARY OF THE INVENTION

The present invention relates to a device that eliminates the need to replace one original end plate of each splice case when repairing a damaged cable line, thus decreasing the time required for cable replacement and reducing possible cable damage during end plate preparation.

The present invention provides an expansion ring for expanding the perimeter of a splice case end plate. The ring comprises two face plates and a rim connected to and separating the face plates, with an aperture extending through the face plates. The ring is designed to fit around the perimeter of the end plate by locating the end plate in the aperture, forming an air tight, environmental seal between end plate and ring. Once the ring is in place, a larger splice case housing can be installed over the expanded end plate.

In a particular embodiment, the expansion ring is annular, comprising two round face plates and a rim in between, with a round aperture extending through the face plates. The ring is designed to expand the diameter of round end plates typically used in cylindrical splice cases.

Also provided are a method of expanding the perimeter of a splice case end plate and a method of installing a larger splice case. Both methods utilize the expansion ring of the present invention.

Further, the present invention provides a splice case having two end plates and a housing, in which at least one end plate is an expanded end plate formed by placing an expansion ring around a smaller perimeter end plate. The housing and two end plates form an air tight, environmentally sealed chamber.

More particularly, a method is provided of repairing a damaged cable line wherein a damaged cable extends through a first end plate on one side of a splice case to an undamaged cable extending through a second end plate on the opposite side of the splice case, in which a plurality of individual wires of the damaged cable are spliced a plurality of individual wires of the undamaged cable in the splice case. The method comprises: (1) opening the splice case to expose the spliced wires; (2) bringing the end of a replacement cable through a temporary, third end plate larger than said first end plate and which is formed with sufficient openings to separately encase the damaged cable, the undamaged cable, and a replacement cable; (3) placing an expansion ring on the second end plate, the expansion ring having a diameter substantially the same as the diameter of the third end plate and formed with an aperture therethrough adapted to receive the second end plate in an environmentally sealing relationship; (4) disconnecting some, but not all, of the spliced wires; (5) placing the damaged cable, undamaged cable partially connected to the damaged cable, and replacement cable partially connected to the undamaged cable in a temporary splice case of a size to form with the third end plate and expansion ring, and environmentally sealing relationship; and (6) thereafter, opening the temporary splice case, finishing splicing remaining wires to completely remove the damaged cable and completely connect the replacement cable to the undamaged cable, then replacing the third end plate with the first end plate, or with a same size substitute therefor, removing the expansion ring, and placing the undamaged cable connected to the replacement in the original splice case, or in a same size substitute therefor, in an environmentally sealing relationship.

The novel features which are believed to be characteristic of the invention, both as to its organization and method of operation, together with further objects and advantages will be better understood from the following description when considered in connection with the accompanying figures, which are somewhat stylized for clearer presentation.

DETAILED DESCRIPTION OF THE INVENTION

Figure 1:
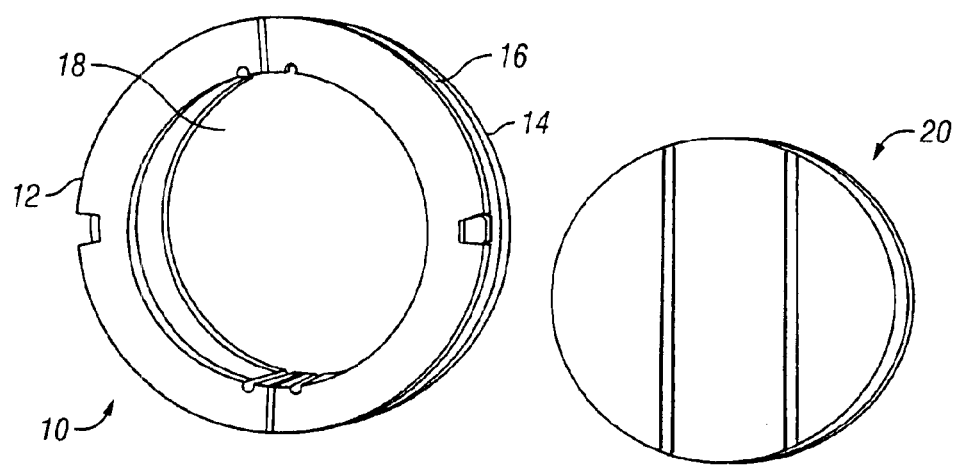
FIG. 1 shows an expansion ring adjacent to a matching end plate.

Splice cases can enclose various cable connection configurations, all of which can be facilitated by the present invention. For ease of reference, and consistency in the drawings, the present description will refer to damaged and replacement cable as being on the left side of the splice case, entering or emerging from the left end wall (left side cable), with the undamaged cable on the right side of the splice case, entering or emerging from the right end wall (right side cable). In simple configurations, the wires of one left side cable are spliced to the wires of one right side cable. In some configurations, there will be only one left side cable and one right side cable. In other configurations, the wires in the cable on one side branch into two or more cables, some wires from the other, single cable, being spliced to wires in the two or more branched cables, for example when some of the wires are going to one building and others to another building. In still other configurations, the wires in one left side cable will be spliced to wires in one right side cable, while the wires in one or more left side cables will be spliced to wires in two or more right side branch cables, or vice-versa.

In the embodiment described in this specification and drawings, there are two left side cables and two right side cables, with wires from each left side cable being spliced to the wires in two respective right side branch cables. The orientation of the drawings are consistent with damage to one of the cables having occurred downstream from the left side (in the drawings) of the splice case. No cables will be replaced on the right side, but one of the cables on the left side will need to be replaced. In this embodiment, once the splice case is opened, wires in the damaged cable on the left side are disconnected from the wires in two of the undamaged branch cables on the right side, a new cable is brought in from the left side, and its wires branched and spliced to the wires from the corresponding undamaged branch cables on the right side.

The expansion ring has an annular circumference, and is formed with an annular aperture centrally located in the expansion ring for fitting around and expanding the circular end plate of a first cylindrical splice case to form an air tight, environmental seal with both the end plate and with a second, larger, splice case housing.

Referring to FIG. 1, a preferred expansion ring 10 of this invention comprises two circular face plates 12 and 14 connected to and separated by a rim 16. The thickness 17 of the expansion ring 10 is defined by the outer surfaces of the face plates 12 and 14. A centrally located round hole 18 for receiving a circular end plate 20 extends through both face plates. When in place, the expansion ring 10 is positioned around the circumference of the end plate 20, thereby expanding the diameter of the end plate 20. For ease of reference, an end plate 20 formed by positioning an expansion ring 10 around a smaller end plate 20 is termed an "expanded" end plate.

The expansion ring 10 is precisely machined to fit over the end plate 20. The expansion ring 10 can be formed from an end plate of the same diameter by cutting a hole therethrough to accommodate a smaller diameter end plate. For example, the expansion ring can be formed from an end plate commercially available from Preformed Line Products Company (Cleveland Ohio); see U.S. Pat. No. 4,424,412, incorporated herein by reference. The surfaces forming the rim and face plates can be manufactured from resistant material such as hard plastic. The expansion ring 10 can be filled with a rigid material such as rigid polyurethane foam.

The expansion ring 10 and end plate 20 form an airtight, environmental seal. Methods to form such seals are well known in the art. The expansion ring 10 can be permanently or reversibly connected to the end plate 20. Preferably, the end plate 20 is reversibly connected.

The thickness of the expansion ring 10 can be any thickness sufficient to form an air tight, environmentally stable seal with a particular end plate 20 and splice case. Therefore, a suitable thickness can be less than, equal to, or greater than the thickness of the end plate 20. In most cases, the thickness will be equal to or greater than the end plate's thickness. Preferably, the thickness is equal to the thickness of the end plate 20.

The rim and edges of the expansion ring face plates are adapted to form an airtight, environmental seal with a splice case housing. The particular adaptations, such as ridges and grooves on the rim surface and cut-outs on the face plates 12 and 14, depend on the specific seal design to be utilized with the housing and are well known in the art. In a preferred embodiment, the expansion ring 10 forms an airtight, environmental seal with a cylindrical splice case housing commercially available from Preformed Line Products Company.

The expansion ring 10 is made of multiple sections, required since an intact expansion ring 10 cannot enable cables attached to an end plate 20 to pass through. Although any number of sections are possible, expansion rings of two or three sections are preferred for convenience. Expansion ring sections can be joined to form an air tight, environmental seal by methods well known in the art. One method uses a cement and a one-sided adhesive, or locking, tape such as those commercially available from Preformed Line Products Company, to provide a seal at the joint between touching expansion ring 10 section surfaces and also between the existing end plate 20 and the expansion ring 10. Expansion ring sections can be held together by well known connector means such as bolts, screws, tape, adhesive, cables, clamps, pins, or combinations thereof. Preferably, sections are held together by one or more bolts, such as 21 in FIG. 10A.

In particular embodiments, expansion rings of this invention are designed to fit around commercially available 4.0", 6.5", or 9.5" diameter end plates such as those available from Preformed Line Products Company. Expansion rings of this invention are adapted to fit commercially available 6.5", 9.5" or 12.5" diameter splice case housings such as those available from Preformed Line Products Company.

In a preferred embodiment, the expansion ring is designed to fit around a 6.5" diameter end plate and adapted to fit a 9.5" diameter splice case housing. Another preferred embodiment is an expansion ring designed to fit around a 9.5" diameter end plate and adapted to fit a 12.5" diameter splice case housing.

As previously described herein, cable repair currently requires the preparation of eight new end plates. Preparing a new end plate is normally a time consuming task involving careful and accurate drilling of holes for receiving cables passing through the end plate. Moreover, each time an end plate is changed, the associated cables must be prepared for air tight, environmental sealing against the end plates holes, a process that consumes additional time. The expansion ring 10 of the present invention can save time by reducing the number of new end plates required for cable repair.

FIGS. 2–15 illustrate a method of using the expansion ring 10 of the present invention. This series of figures presents a cable repair in a working splice case 22. For convenience, only one splice case 22 is shown even though two splice cases are involved in cable replacement, one on each side of the damaged cable. The same replacement steps are carried out with the second splice case. Splice cases were obtained from Preformed Line Products Company.

Figure 2:
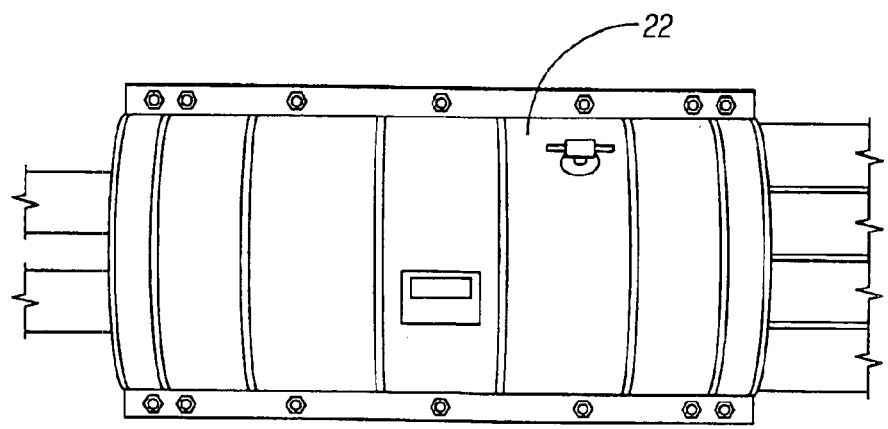
FIG. 2 shows a 9.5" diameter splice case with associated cables.
Figure 3:
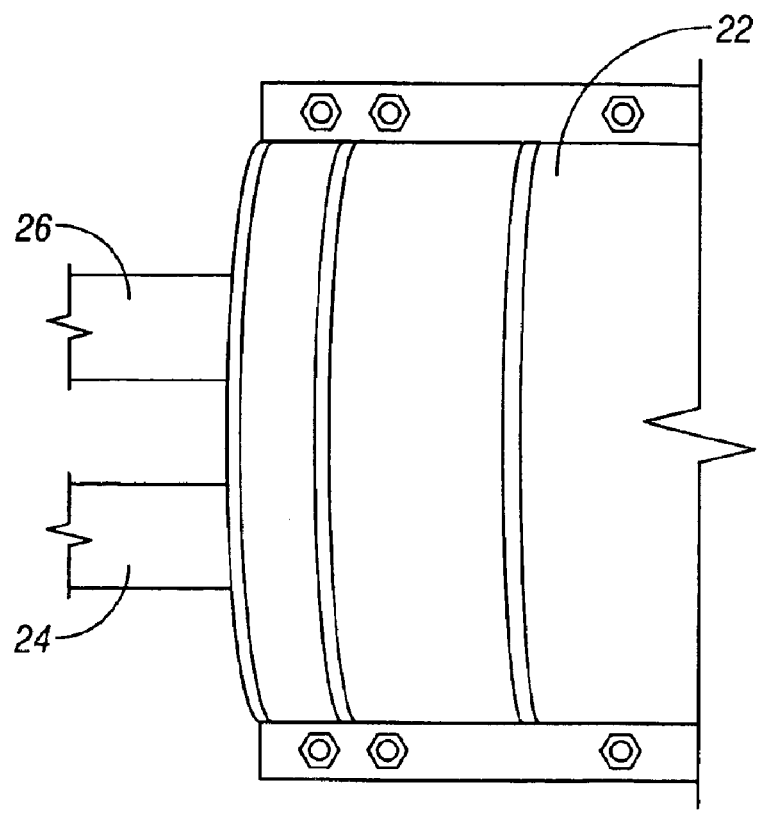
FIG. 3 shows a "damaged" cable at one end of a splice case.

FIG. 2 shows a 9.5" diameter splice case 22 with all cables entering the splice case 22 being spliced. In FIG. 3, one cable 24 of two cables 24 and 26 at one end of the splice case 22 has been damaged somewhere down the line.

Figure 4:
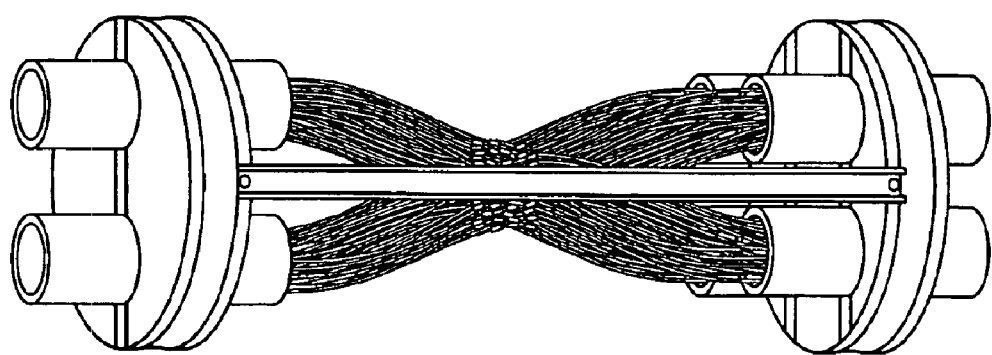
FIG. 4 shows a splice case open, exposing a cable splice.
Figure 5:
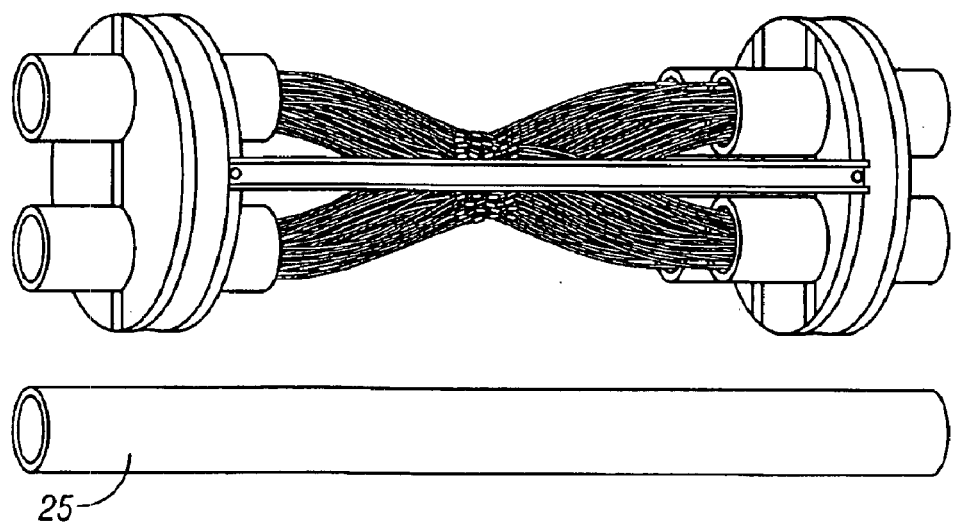
FIG. 5 shows a replacement cable adjacent to a splice case.
Figure 6:
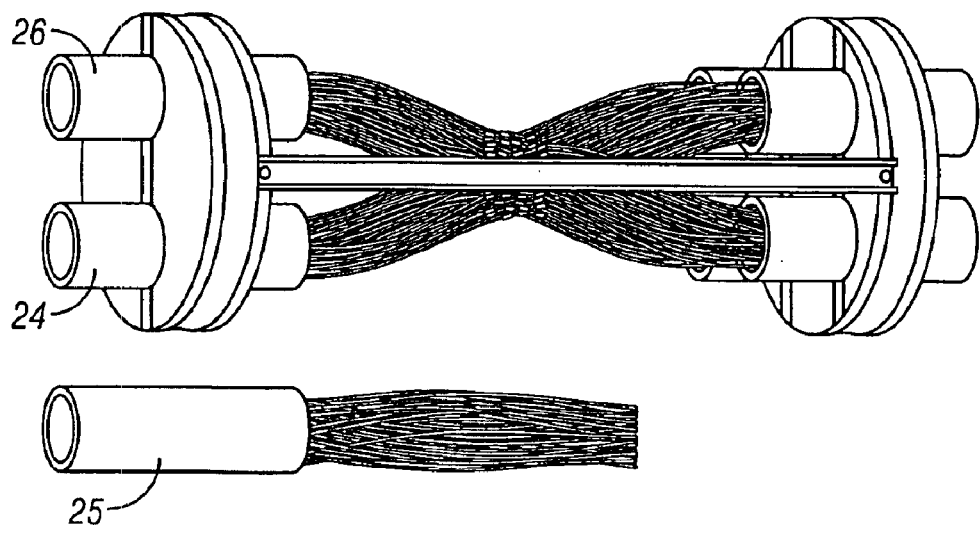
FIG. 6 shows an open section of replacement cable with individual conductors exposed.

To begin the repair, the housing of the splice case 22 is opened, exposing the cable splice, as shown in FIG. 4. In FIG. 5, a replacement cable 25 has been placed adjacent to the exposed wires. A section of replacement cable 25 is opened to expose individual cable conductors, in preparation for cable transfer, as shown in FIG. 6. Together, the replacement cable section and the original cable splice would be too large to fit inside the original 9.5" diameter splice case 22. Thus, a larger diameter splice case 28 (FIG. 11) is required. Here, a 12.5" diameter splice case 28 is utilized.

Figure 7:
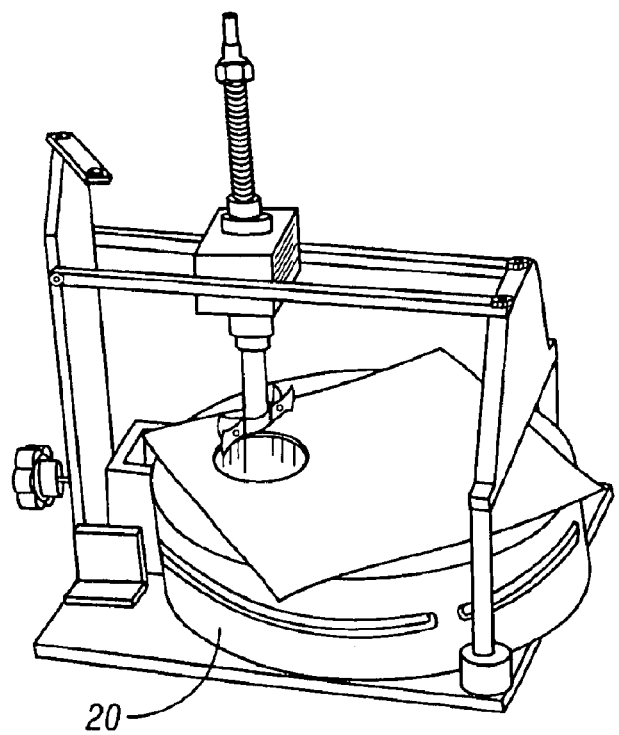
FIG. 7 shows a new 12.5" diameter end plate being prepared.

FIG. 7 shows a new 12.5" diameter end plate 20 being prepared. Holes for receiving the replacement cable and two original cables are accurately drilled into the new end plate 20 by employing a plate cutter apparatus, as is well known to the art. This end plate 20 replaces the 9.5" diameter end plate closest to the damaged cable.

Figure 8:
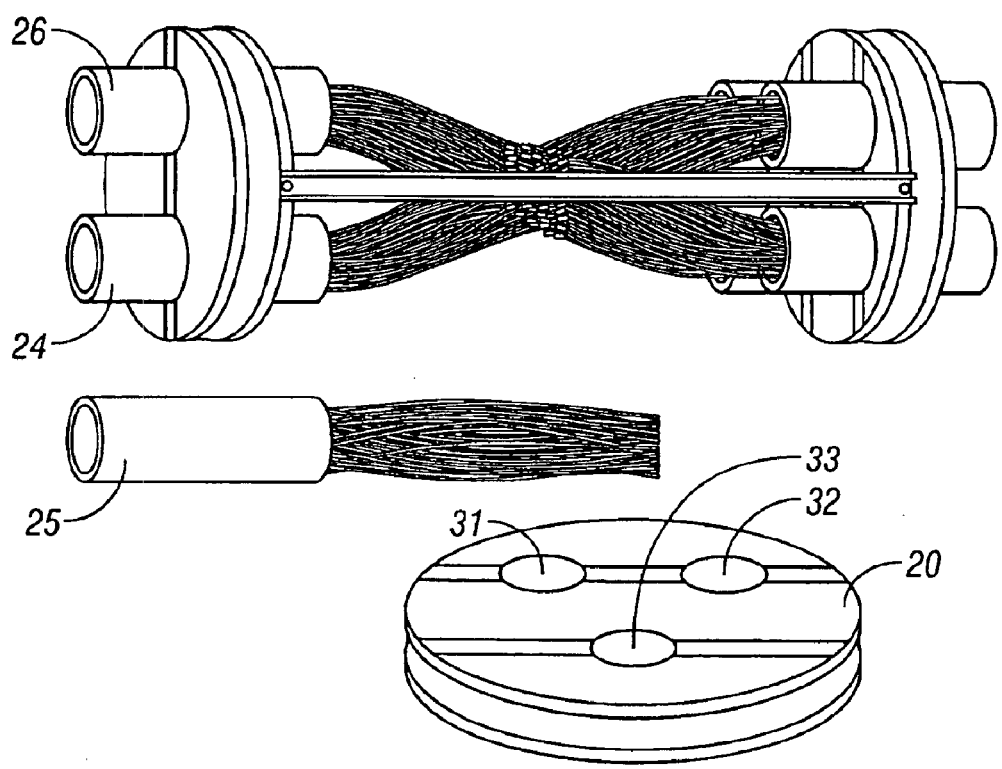
FIG. 8 shows an 12.5" diameter end plate prepared to receive three cables.
Figure 9:
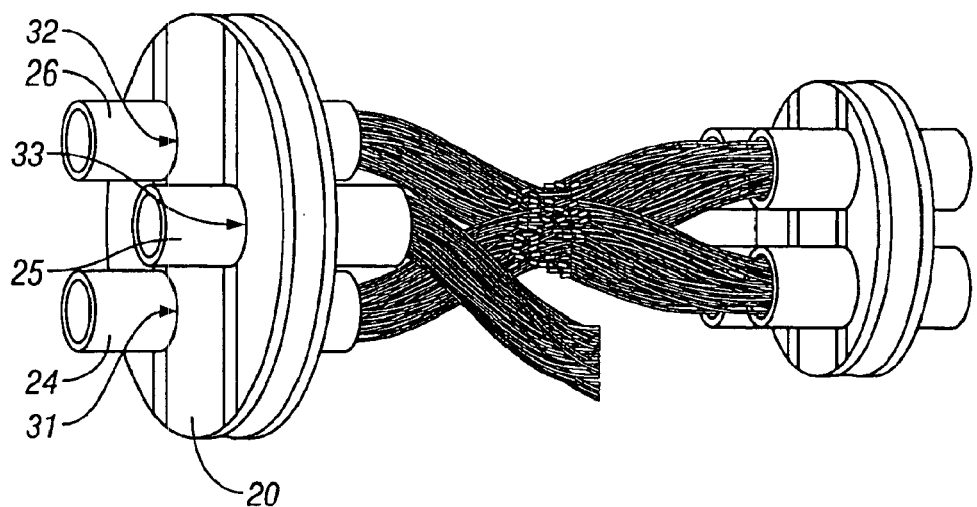
FIG. 9 shows a 12.5" diameter end plate installed over three cables.

FIG. 8 shows the prepared 12.5" diameter end plate 20 with holes 31, 32, 33 ready to receive the three cables, respectively the damaged cables 24, the undamaged cable 26, and the replacement cable 25. FIG. 9 shows the new 12.5" diameter end plate 20 installed over the cables 24, 25, 26 wherein wires in the replacement cable 25 will be spliced to wires in the branch cables 37 and 39.

The opposite end plate 21 does not require an additional hole because the replacement cable does not pass through this end plate. Instead, the replacement cable is spliced into the undamaged, original cable that passes through this end plate. Since no additional hole is required, the end plate 21 can be fitted with the expansion ring 10 of the present invention, as shown in FIG. 10, eliminating the time-consuming tasks of preparing a new end plate and preparing cable seals.

Figure 10:
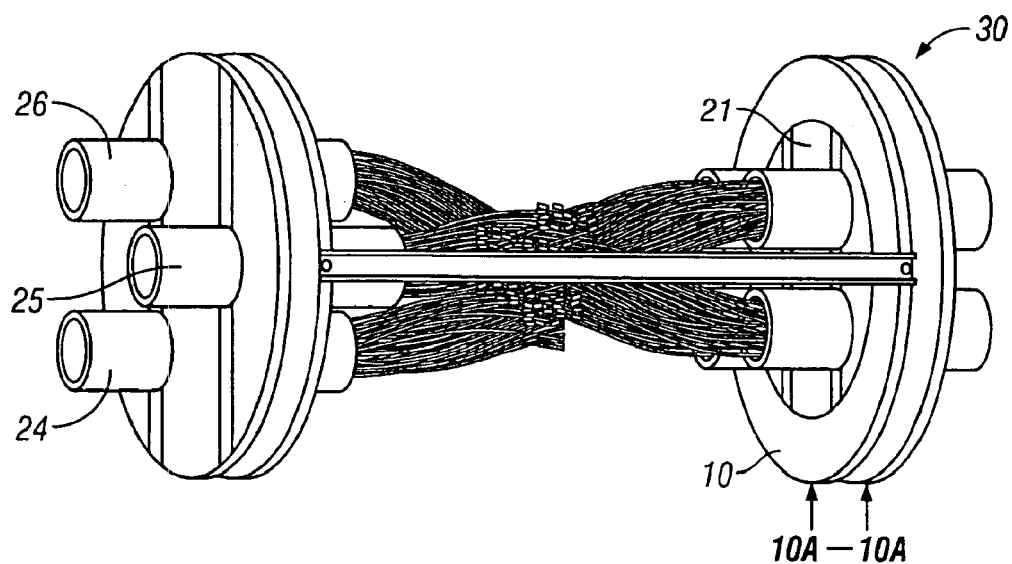
FIG. 10 shows a 12.5" diameter extension ring installed over a 9.5" diameter end plate.
Figure 10A:
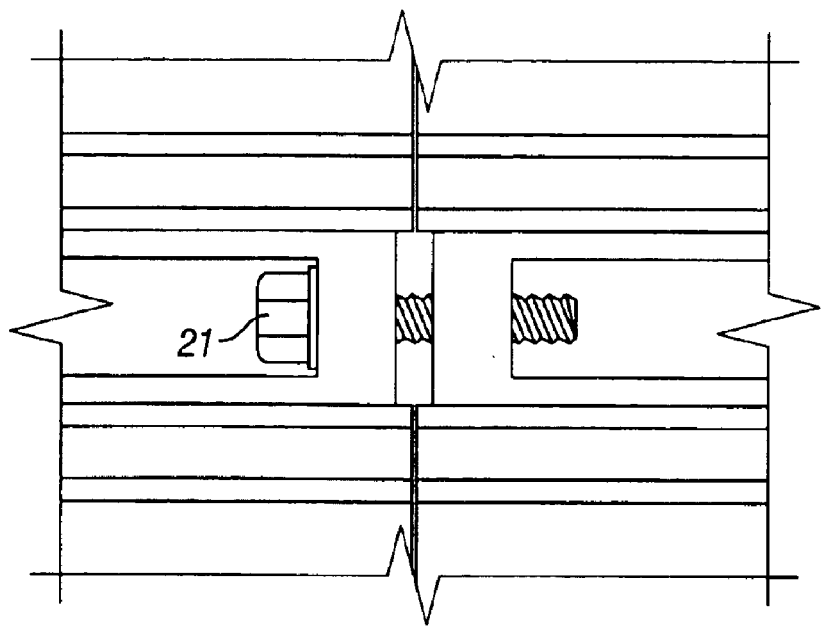
FIG. 10A is a section on FIG. 10 showing a bolt connecting the sections of the expansion ring.
Figure 11:
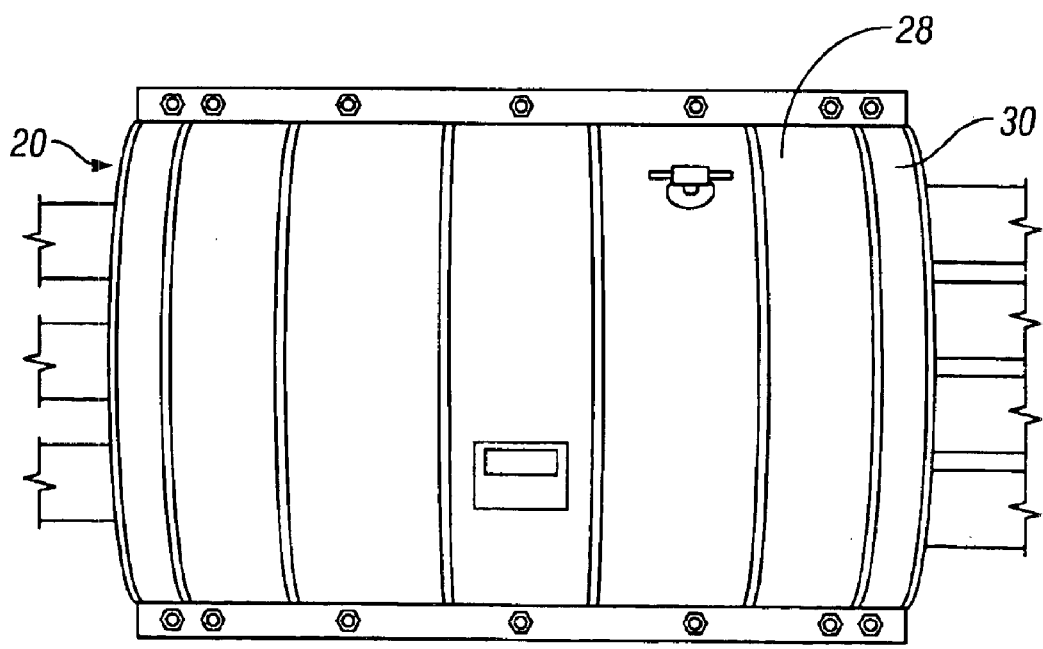
FIG. 11 shows a 12.5" diameter splice case with associated cables.
Figure 12:
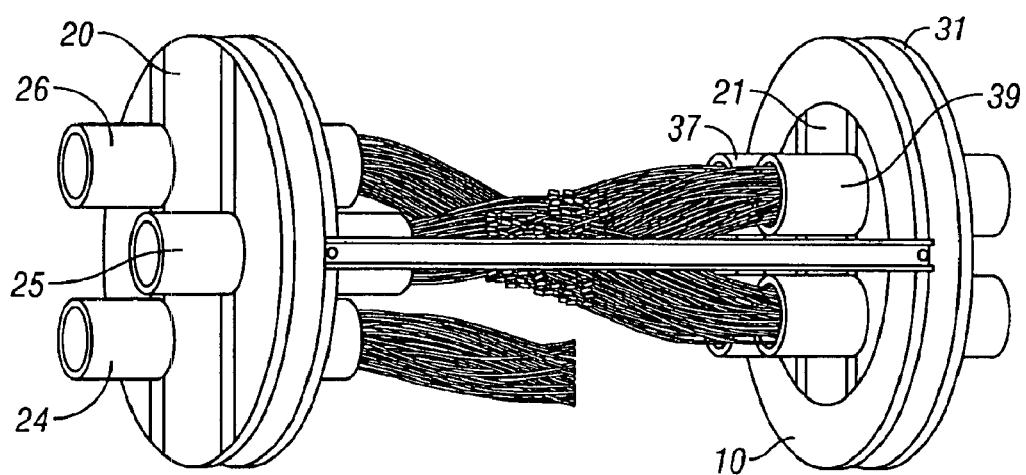
FIG. 12 shows a 12.5" diameter expanded end plate and a 12.5" end plate in place.

In FIG. 10, a 12.5" diameter expansion ring 10 has been installed over the original 9.5" diameter end plate 21 to provide an expanded end plate structure 30. The cable will not be removed from the original end plate 21. As shown in FIG. 10, part of the wires of the damaged cable 24 have been replaced by corresponding wires of the replacement cable 25. A 12.5" diameter splice case 28 is installed over the end plates to seal the cables at the end of each working day, as shown in FIG. 11. FIG. 12 shows the wiring on the last day wherein all the wires from the replacement cable 25 have replaced the wires from the damaged cable 24, having been spliced to the wires going to the branch cables 37 and 39.

Figure 13:
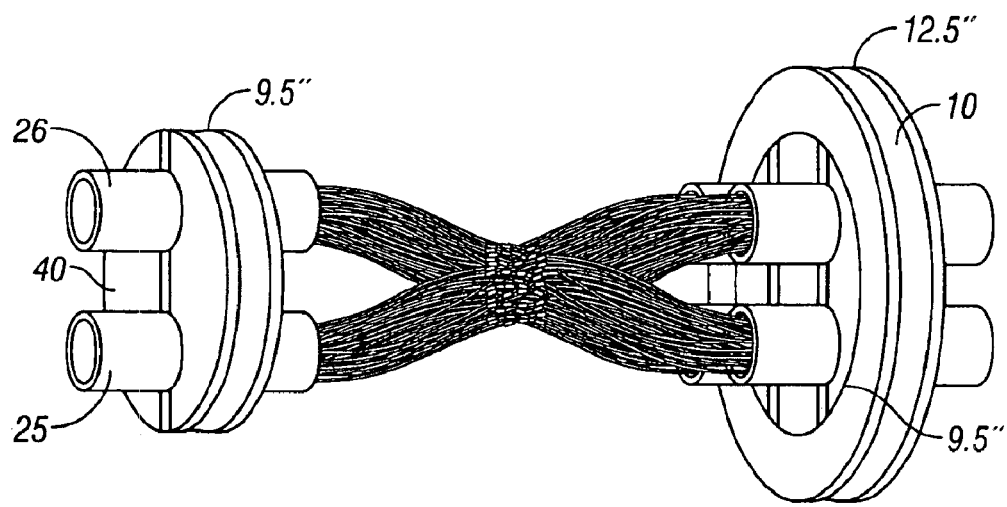
FIG. 13 shows a new 9.5" diameter end plate in place with a 12.5" diameter extended end plate.
Figure 14:
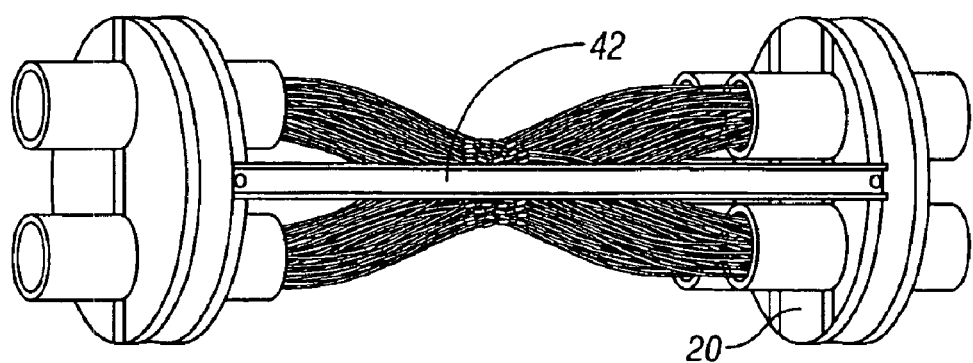
FIG. 14 shows a new 9.5" diameter end plate in place with a 9.5" diameter end plate from which a 12.5" diameter expansion ring has been removed.
Figure 15:
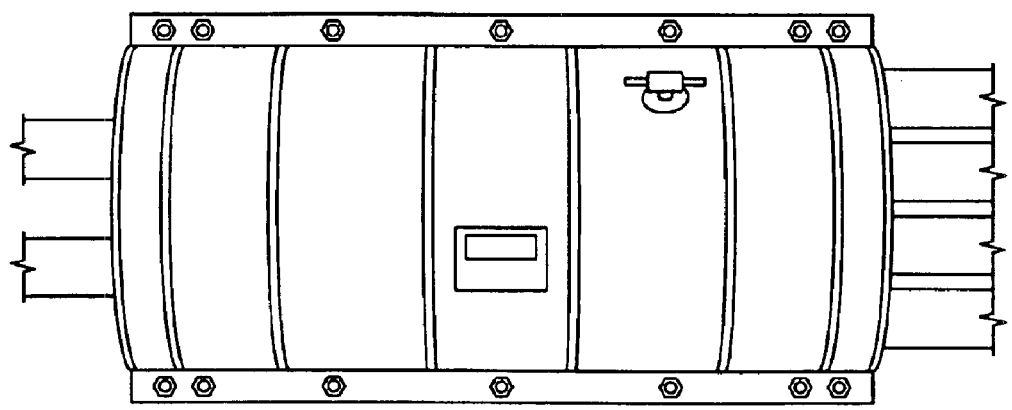
FIG. 15 shows a 9.5" diameter splice case reinstalled.

Once transfer is complete and the damaged cable has been trimmed out of the splice, the 9.5" diameter splice case 22 (FIG. 15) must be reinstalled due to space limitations in the manhole. Reinstallation requires the preparation of a new 9.5" diameter end plate 40 to replace the existing 12.5" diameter end plate. FIG. 13 shows the new 9.5" end plate 40 installed over the cables, including the replacement cable 25 and undamaged cable 26 (the end plate 40 is rotated somewhat in the drawing so that the cable openings are shown vertically aligned). At the other end of the splice, the expansion ring 10 is shown still in place over the original 9.5" end plate 20. In FIG. 14, the expansion ring 10 has been removed, leaving the original 9.5" end plate 20 intact. To complete the repair, a torsion bar 42 is installed and the 9.5" splice case 22 housing is reinstalled, as shown in FIG. 15.

Use of the expansion ring 10 permits one of the two original end plates to remain intact. For this intact end plate, two new replacement end plates (one for moving to the 12.5" slice case 28, one for moving back to the 9.5" splice case 22) are eliminated. Given that two splice cases are involved, a total of four new end plates, out of eight end plates used by the prior art, are unnecessary when the expansion ring 10 is employed. It takes approximately four man hours to replace an end plate. By eliminating four end plates, the expansion ring 10 can save approximately sixteen man hours during cable repair.

Another advantage of using the expansion ring 10 is that possible cable damage is reduced because potential cable deformities introduced by end plate installation and removal are minimized by maintaining intact end plates.

What is claimed is:

1. In combination, an end plate for a splice case and an expansion ring for expanding a perimeter of the end plate, the end plate having first and second flat coterminous opposite sides and formed of at least two end plate sections, each end plate section having an edge, the edges of said at least two end plate sections opposing and abutting each other in mating relationship whereby to define at least two apertures, each through both sides of the end plate and through which cables can be inserted, the expansion ring being designed to fit around the end plate perimeter, the expansion ring having first and second flat coterminous opposite sides and formed of at least two expansion ring sections, each expansion ring section having an edge, the edges of said at least two expansion ring sections opposing and abutting each other in mating relationship whereby to define at least one aperture through which the cad plate can be inserted, the first side of the expansion ring being coplanar with the first side of the end plate, and the second side of the expansion ring being coplanar with the second side of the end plate.

2. The combination of claim 1 in which the expansion ring is adapted to fit a cylindrical splice case housing.

3. The combination of claim 2 in which the expansion ring is annular.

4. The combination of claim 1 in which the mated end plate is circular and the expansion ring aperture is receives the circular end plate.

5. The combination of claim 4 in which the expansion ring aperture is a round hole.

6. The combination of claim 1 in which the expansion ring aperture receives the end plate in an environmentally sealing and air tight relationship.

7. In combination, a circular end plate for a splice case and an annular expansion ring for expanding the diameter of the end plate, the end plate having first and second flat coterminous opposite sides and formed of at least two end plate sections, each end plate section having an edge, the edges of said at least two end plate sections opposing and abutting each other in mating relationship whereby to define at least two apertures, each through both sides of the end plate and through which cables can be inserted, the expansion ring being designed to circumferentially surround the end plate, the expansion ring having first and second flat coterminous opposite sides and formed of at least two expansion ring sections, each expansion ring section having an edge, the edges of said at least two expansion ring sections opposing and abutting each other in mating relationship whereby to define at least one aperture through which the end plate can be inserted, the expansion ring comprising two circular face plates and a rim connected to and separating the face plates, the aperture in the expansion ring receiving the circular end plate in an environmentally sealing relationship, the first side of the expansion ring being coplanar with the first side of the end plate, and the second side of the expansion ring being coplanar with the second side of the end plate.

8. A method of expanding the perimeter of an end plate of a splice case, the end plate having first and second flat coterminous opposite sides and formed of at least two end plate sections, each end plate section having an edge, the edges of said at least two end plate sections opposing and abutting each other in mating relationship whereby to define at least two apertures, each through both sides of the end plate and through which cables can be inserted, the method comprising:

providing an expansion ring having first and second flat coterminous opposite sides and formed of at least two expansion ring sections, each expansion ring section having an edge, the edges of said at least two expansion ring sections opposing and abutting each other in mating relationship whereby to define at least one aperture through which the end plate can be inserted, the aperture receiving the end plate in an environmentally sealing relationship by positioning the expansion ring around the perimeter of the end plate; the first side of the expansion ring being coplanar with the first side of the end plate, and the second side of the expansion ring being coplanar with the second side of the end plate.

9. The method of claim 8 in which the expansion ring is an annular ring.

10. The method of claim 8 in which the aperture is a round hole.

11. A method of expanding a diameter of a circular end plate of a splice case, the end plate having first and second flat coterminous opposite sides and formed of at least two end plate sections, each end plate section having an edge, the edges of said at least two end plate sections opposing and abutting each other in mating relationship whereby to define at least two apertures, each through both sides of the end plate and through which cables can be inserted, the method comprising:

providing an annular expansion ring having first and second flat coterminous opposite sides and formed of at least two expansion ring sections, each expansion ring section having an edge, the edges of said at least two expansion ring sections opposing and abutting each other in mating relationship whereby to define at least one aperture through which the end plate can be inserted and comprising two circular face plates and a rim connected to and separating the face plates, the expansion ring receiving the end plate in an environmentally sealing relationship by positioning the expansion ring around the circumference of the end plate, the first side of the expansion ring being coplanar with the first side of the end plate, and the second side of the expansion ring being coplanar the second side of the end plate.

12. A method of installing a larger splice case housing around an end plate sized to fit a smaller splice case housing, the end plate having first and second flat coterminous opposite sides and formed of at least two end plate sections, each end plate section having an edge, the edges of said at least two end plate sections opposing and abutting each other in mating relationship whereby to define at least two apertures, each through both sides of the end plate and through which cables can be inserted, the method comprising the steps of:

expanding the perimeter of the end plate by encircling it with an expansion ring having first and second flat coterminous opposite sides and formed of at least two expansion ring sections, each expansion ring section having an edge, the edges of said at least two expansion ring sections opposing and abutting each other in mating relationship whereby to define at least one aperture through which the end plate can be inserted, the first side of the expansion ring being coplanar with the first side of the end plate, and the second side of the expansion ring being coplanar with the second side of the end plate; and installing the larger splice case housing around the expanded end plate in an environmentally sealing manner.

13. The method of claim 12 in which the expansion ring comprises two face plates and a rim connected to and separating the face plates, and having an aperture extending through the face plates, the aperture receiving the end plate in an environmentally sealing relationship.

14. The method of claim 13 in which the expansion ring is an annular ring and the face plates are circular face plates.

15. The method of claim 13 in which the expansion ring aperture is a round hole.

16. The method of claim 13 in which the aperture receives the end plate in an airtight relationship.

17. The method of claim 12 in which the installing step further comprises installing the larger housing around the expanded end plate in an airtight manner.

18. A method of installing a cylindrical splice case housing around a circular end plate of smaller diameter, the end plate having first and second flat coterminous opposite sides and formed of at least two end plate sections, each end plate section having an edge, the edges of said at least two end plate sections opposing and abutting each other in mating relationship whereby to define at least two apertures, each through both sides of the end plate and through which cables can be inserted, the method comprising:

expanding the diameter of the end plate by positioning an annular expansion ring around the circumference of the end plate, the expansion ring having first and second flat coterminous opposite sides and formed of at least two expansion ring sections, each expansion ring section having an edge, the edges of said at least two expansion ring sections opposing and abutting each other in mating relationship whereby to define at least one aperture through which the end plate can be inserted, the expansion ring aperture receiving the circular end plate in an airtight, environmentally sealing relationship, the first side of the expansion ring being coplanar with the first side of the end plate, and the second side of the expansion ring being coplanar with the second side of the end plate; and installing the splice case housing around the expanded end plate in an airtight, environmentally sealing manner.

19. A splice case comprising:

two similarly dimensioned end plates, each of the end plates having first and second flat coterminous opposite sides and formed of at least two end plate sections, each end plate section having an edge, the edges of said at least two end plate sections opposing and abutting each other in mating relationship whereby to define at least two apertures, each through both sides of the end plate and through which cables can be inserted, at least one end plate being an expanded end plate, the expanded end plate comprising an expansion ring and an end plate smaller in perimeter than the expanded end plate, the expansion ring having first and second flat coterminous opposite sides and formed of at least two expansion ring sections, each expansion ring section having an edge, the edges of said at least two expansion ring sections opposing and abutting each other in mating relationship whereby to define at least one aperture through which the smaller end plate can be inserted, the smaller end plate being formed of at least two sections that mate to define said at least one aperture through which the cable can be inserted, the first side of the expansion ring being coplanar with the first side of the end plate, and the second side of the expansion ring being coplanar with the second side of the end plate; and a housing receiving each of the two similarly dimensioned end plates in an environmentally sealing relationship such that an enclosed chamber forms therebetween.

20. The splice case of claim 19 in which the similarly dimensioned end plates are circular end plates of similar diameter.

21. The splice case of claim 19 in which the housing is a cylindrical housing.

22. The splice case of claim 19 in which the housing receives the similarly dimensioned end plates in an airtight relationship.

23. A cylindrical splice case comprising:

two circular end plates of similar diameter, each of the end plates having first and second flat coterminous opposite sides and formed of at least two end plate sections, each end plate section having an edge, the edges of said at least two end plate sections opposing and abutting each other in mating relationship whereby to define at least two apertures, each through both sides of the end plate and through which cables can be inserted, at least one end plate being an expanded end plate, the expanded end plate comprising an annular expansion ring and a circular end plate of smaller diameter than the expanded end plate, the expansion ring having first and second flat coterminous opposite sides and formed of at least two expansion ring sections, each expansion ring section having an edge, the edges of said at least two expansion ring sections opposing and abutting each other in mating relationship whereby to define at least one aperture through which the smaller end plate can be inserted, the smaller end plate being formed of at least two sections that mate to define said at least one aperture through which the cable can be inserted, the first side of the expansion ring being coplanar with the first side of the end plate, and the second side of the expansion ring being coplanar with the second side of the end plate; and a cylindrical housing receiving each of the two circular end plates of similar diameter in an airtight, environmentally sealing relationship such that an enclosed chamber forms therebetween.

* * * * *